(12) United States Patent
Li et al.

(10) Patent No.: US 12,284,725 B2
(45) Date of Patent: Apr. 22, 2025

(54) METHOD AND APPARATUS FOR RESOURCE ASSIGNMENT

(71) Applicant: Telefonaktiebolaget LM Ericsson (publ), Stockholm (SE)

(72) Inventors: Jingye Li, Beijing (CN); Chunhui Liu, Beijing (CN); Liping Han, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 410 days.

(21) Appl. No.: 17/625,371

(22) PCT Filed: Jul. 12, 2019

(86) PCT No.: PCT/CN2019/095706
§ 371 (c)(1),
(2) Date: Jan. 7, 2022

(87) PCT Pub. No.: WO2021/007687
PCT Pub. Date: Jan. 21, 2021

(65) Prior Publication Data
US 2022/0272525 A1    Aug. 25, 2022

(51) Int. Cl.
 H04W 8/26    (2009.01)
 H04L 5/00    (2006.01)
(52) U.S. Cl.
 CPC ............ *H04W 8/26* (2013.01); *H04L 5/0053* (2013.01)
(58) Field of Classification Search
 None
 See application file for complete search history.

(56) References Cited

U.S. PATENT DOCUMENTS

2013/0188594 A1* 7/2013 Cesar .................. H04W 72/541
 370/329
2015/0029910 A1* 1/2015 He ........................ H01Q 1/243
 370/280
(Continued)

FOREIGN PATENT DOCUMENTS

CN    102802269 A    11/2012
CN    104427494 A    3/2015
(Continued)

OTHER PUBLICATIONS

"Discussion on hierarchical search space structure", 3GPP TSG RAN WG1 Meeting #90; R1-1713167; Prague, Czech Republic, Aug. 21-25, 2017, pp. 1-10.
(Continued)

*Primary Examiner* — Srinivasa R Reddivalam
(74) *Attorney, Agent, or Firm* — Sage Patent Group

(57) ABSTRACT

A method implemented by a network node in a communication network is provided. The method comprises: assigning a radio network temporary identity (RNTI) comprised in one of a first number of groups corresponding to an aggregation level to a user equipment (UE) associated with the one group; wherein for the first number of UEs, different UEs are associated with different groups corresponding to different control channel elements (CCEs). In the present disclosure, the number of OFDM symbols used for the PDCCH can be reduced, thereby increasing cell throughout since less PDCCH resource implies more PDSCH resources, and decreasing PDCCH blind detection duration and UE power consumption.

16 Claims, 8 Drawing Sheets

(56) References Cited

U.S. PATENT DOCUMENTS

| | | | |
|---|---|---|---|
| 2016/0234853 A1* | 8/2016 | Yang | H04J 11/0023 |
| 2016/0373901 A1 | 12/2016 | Urabayashi et al. | |
| 2017/0006584 A1* | 1/2017 | Ren | H04W 72/542 |
| 2018/0192434 A1 | 7/2018 | Lee et al. | |
| 2020/0029383 A1* | 1/2020 | Venugopal | H04B 7/088 |

FOREIGN PATENT DOCUMENTS

| | | |
|---|---|---|
| CN | 107623948 B | 7/2020 |
| WO | 2018108247 A1 | 6/2018 |

OTHER PUBLICATIONS

"3GPP TS 38.213 V15.4.0", 3rd Generation Partnership Project; Technical Specification Group Radio Access Network; NR; Physical layer procedures for control; (Release 15), Dec. 2018, pp. 1-104.

"3GPP TS 36.213 V10.0.0", 3rd Generation Partnership Project; Technical Specification Group Radio Access Network; Evolved Universal Terrestrial Radio Access (E-UTRA); Physical layer procedures (Release 10), Dec. 2010, pp. 1-98.

"3GPP TS 36.213 V12.0.0", 3rd Generation Partnership Project; Technical Specification Group Radio Access Network; Evolved Universal Terrestrial Radio Access (E-UTRA); Physical layer procedures (Release 12), Dec. 2013, pp. 1-186.

\* cited by examiner

METHOD AND APPARATUS FOR RESOURCE ASSIGNMENT

TECHNICAL FIELD

The present disclosure generally relates to the field of resource assignment, and more specifically to a method and apparatus for resource minimization.

BACKGROUND

This section introduces aspects that may facilitate better understanding of the present disclosure. Accordingly, the statements of this section are to be read in this light and are not to be understood as admissions about what is in the prior art or what is not in the prior art.

From the analogue technique to the Long Term Evolution (LTE), each generation of mobile technology has been motivated by a need to address challenges which are not overcome by its predecessor. The $5^{th}$ generation (5G) of mobile technology focuses on demands and businesses beyond the LTE. It is expected to obtain a fully mobile and connected society related to a tremendous growth in connectivity and density/volume of traffic that may be required in the near future.

A Physical Downlink Control Channel (PDCCH) may carry a message called Downlink Control Information (DCI) which may include resource assignment for a User Equipment (UE) or a group of UEs. A base station may transmit a plurality of DCIs or PDCCHs in one subframe. It may need to transmit a great amount of parameters to the UE for its operation, but there may be cases in which some information is not required for a particular UE.

In the 4th generation (4G) LTE, the PDCCH may use resources present in first nOFDM symbols, where n is given in a Physical Control Format Indicator Channel (PCFICH). A Control Channel Element (CCE) index may be used to refer to a CCE number at which control channel data (PDCCH) is allocated. Normally this index may change for each subframe, meaning that even the same PDCCH data (e.g., a PDCCH for the same UE) allocated in each subframe may change subframe by subframe. The CCE index may be decided by an eNB according to the following formula:

$$L\left\{(Y_k + m) \bmod \left\lfloor \frac{N_{CCE,k}}{L} \right\rfloor\right\} + i,$$

where $Y_{-1}=n_{RNTI} \neq 0$, which is determined by a Radio Network Temporary Identity (RNTI) assigned to each UE, where L denotes the aggregation level; $Y_k=(A \cdot Y_{k-1}) \bmod D$, wherein $A=39827$ and $D=65537$; $m=0, \ldots, M^{(L)}-1$, wherein $M^{(L)}$ is the number of PDCCH candidates to monitor in a given search space, $N_{CCE,k}$ denotes the CCE number in subframe k, and $i=0, \ldots, L-1$, as described in 3GPP 36.213 V12.00 9.1.1.

In the 5G New Radio (NR), a similar formula below may be used to determine the CCE index:

$$L \cdot \left\{\left(Y_{p,n_{s,f}^\mu} + \left\lfloor \frac{m_{s,n_{CI}} \cdot N_{CCE,p}}{L \cdot M_{s,max}^{(L)}} \right\rfloor + n_{CI}\right) \bmod \lfloor N_{CCE,p}/L \rfloor\right\} + i$$

where $Y_{p,-1}=n_{RNTI} \neq 0$, which is still determined by the RNTI assigned to each UE, where for any common search space (CSS), $Y_{p,n_{s,f}^\mu}=0$;
for a UE-specific search space (USS), $Y_{p,n_{s,f}^\mu}=(A_p \cdot Y_{p,n_{s,f}^\mu-1}) \bmod D$, $Y_{p,-1}=n_{RNTI} \neq 0$, $A_p=:39827$ for p mod $3=0$, $A_p=39829$ for p mod $3=1$, $A_p=39839$ for p mod $3=2$, and $D=65537$;
$i=0, \ldots, L-1$;
$N_{CCE,p}$ is the number of CCEs, numbered from 0 to $N_{CCE,p}-1$, in CORESET p;
$n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$;
$m_{s,n_{CI}}=0, \ldots, M_{s,n_{CI}}-1$, where $M_{s,n_{CI}}^{(L)}$ is the number of PDCCH candidates the UE is configured to monitor for aggregation level L of a search space set s for a serving cell corresponding to $n_{CI}$;
for any CSS, $M_{s,max}^{(L)}=M_{s,0}^{(L)}$;
for a USS, $M_{s,max}^{(L)}$ is the maximum of $M_{s,n_{CI}}^{(L)}$ over all configured n, values for a CCE aggregation level L of search space set s,
as defined in 3GPP 38.213 V15.4, 10.1.

However, the $3^{rd}$ Generation Partner Project (3GPP) does not define a specific manner to assign RNTIs to UEs. Thus, RNTIs may somehow be randomly assigned to UEs. Then, CCE conflicts may occur. This means that either more OFDM symbols must be used to accommodate CCE requests by the UEs or even some UE downlink or uplink transmissions have to be declined due to unavailable CCE resources.

Furthermore, as the CCE conflicts occur frequently, it implies that a CCE part assigned to one UE may not be the one starting from the first CCE of a search space. Then, the UE has to search more CCEs for blind PDCCH detection. This may not be friendly for power saving or processing timing.

SUMMARY

It is an object of the present disclosure to propose an RNTI assignment method and apparatus for either employing a static list of RNTIs for a limited number of UEs, or strategically assigning RNTIs to UEs. With the present disclosure, in both NR and LTE environments, a gNB or an eNB can allocate the PDCCH for one UE, starting from the first CCE within its search space.

According to a first aspect of the present disclosure, a method implemented by a network node in a communication network is provided. The method comprises: assigning a radio network temporary identity (RNTI) comprised in one of a first number of groups corresponding to an aggregation level to a user equipment (UE) associated with the one group; wherein for the first number of UEs, different UEs are associated with different groups corresponding to different control channel elements (CCEs).

In an alternative embodiment of the first aspect, the method may further comprise: assigning one or more CCEs to the UE according to the RNTI assigned to the UE.

In an alternative embodiment of the first aspect, the method may further comprise: assigning one or more CCEs corresponding to the one group comprising the RNTI.

In a further alternative embodiment of the first aspect, the UE may be associated with the group among the first number of groups by sequence.

According to a second aspect of the present disclosure, a network node in a communication network is provided. The network node comprises a processor and a memory communicatively coupled to the processor and adapted to store instructions. When the instructions are executed by the processor, the instructions cause the network node to perform operations of the method according to the above first aspect.

According to a third aspect of the present disclosure, a non-transitory computer readable medium having a computer program stored thereon is provided. When the computer program is executed by a set of one or more processors of a network node in a communication network, the computer program causes the network node to perform operations of the method according to the above first aspect.

In the present disclosure, the number of OFDM symbols used for the PDCCH can be reduced, thereby increasing cell throughout since less PDCCH resource implies more PDSCH resources, and decreasing PDCCH blind detection duration and UE power consumption.

BRIEF DESCRIPTION OF THE DRAWINGS

The present disclosure may be best understood by way of example with reference to the following description and accompanying drawings that are used to illustrate embodiments of the present disclosure. In the drawings.

DETAILED DESCRIPTION

Figure 1:
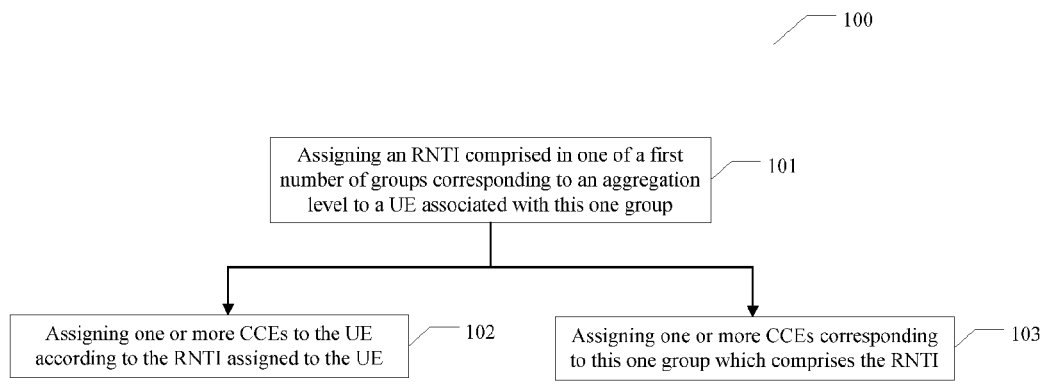
FIG. 1 is a flow chart illustrating a method for resource assignment according to some embodiments of the present disclosure.

The following detailed description describes a method and apparatus for resource assignment. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed texts and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

In the following detailed description and claims, the terms "coupled" and "connected", along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device stores and transmits (internally and/or with other electronic devices) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other forms of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical interfaces to establish connections (to transmit and/or receive code and/or data using propagating signals) with other electronic devices. One or more parts of an embodiment of the present disclosure may be implemented using different combinations of software, firmware, and/or hardware.

In order to demo a peak throughput of an NR or LTE cell, a downlink throughput may be expected to be as high as possible when all UEs attached to a cell have good channel quality. Therefore, a gNB or an eNB may store a static or semi-static list of RNTIs, which may be externally configured. When a UE is attached to the cell, one of the RNTIs may be assigned to this UE for data transmission. This list of RNTIs is designed such that CCE conflicts can be minimized or be completely avoided.

An example of such a static list of Cell Radio Network Temporary Identities (C-RNTIs) in the LTE is shown in Table I below. When an aggregation level (AL) equals to 1 for all the UEs, there is no CCE conflict. In an example, Table I below may be generated by exhaustive search.

TABLE I

Exemplary Static List of C-RNTIs in the LTE
cceStartIndex (TDD configure = 2)
Ant = 2, Ng = 1/6, CFI = [3,3,-,3,3,3,3,-,3,3]; M(AL = 1) = 6,
Ncce = [88,88,-,87,88,88,88,-,87,88]

| UENum | C-RNTI | 0 D | 1 S | 3 D DL Assign | 3 D UL Grant | 4 D | 5 D | 6 S | 8 D DL Assign | 8 D UL Grant | 9 D |
|---|---|---|---|---|---|---|---|---|---|---|---|
| 1 | 164 | 81 | 30 | 20 | 21 | 31 | 56 | 41 | 42 | 43 | 71 |
| 2 | 167 | 16 | 32 | 26 | 27 | 38 | 48 | 24 | 78 | 79 | 70 |
| 3 | 176 | 62 | 38 | 18 | 19 | 78 | 66 | 15 | 38 | 39 | 44 |
| 4 | 180 | 71 | 70 | 58 | 59 | 35 | 54 | 65 | 28 | 29 | 35 |
| 5 | 260 | 86 | 25 | 48 | 49 | 28 | 44 | 28 | 54 | 55 | 31 |
| 6 | 279 | 76 | 67 | 66 | 67 | 81 | 34 | 77 | 50 | 51 | 82 |
| 7 | 291 | 57 | 52 | 38 | 39 | 40 | 21 | 51 | 20 | 21 | 55 |
| 8 | 332 | 83 | 27 | 80 | 81 | 42 | 58 | 67 | 74 | 75 | 68 |
| 9 | 424 | 79 | 78 | 42 | 43 | 82 | 35 | 69 | 70 | 71 | 37 |
| 10 | 452 | 50 | 15 | 52 | 53 | 22 | 43 | 44 | 26 | 27 | 62 |
| 11 | 520 | 84 | 73 | 70 | 71 | 79 | 23 | 56 | 82 | 83 | 85 |
| 12 | 739 | 56 | 58 | 50 | 51 | 17 | 76 | 68 | 56 | 57 | 61 |
| 13 | 797 | 35 | 80 | 16 | 17 | 61 | 19 | 64 | 24 | 25 | 30 |
| 14 | 1478 | 24 | 51 | 74 | 75 | 34 | 64 | 48 | 86 | 87 | 34 |
| 15 | 1517 | 78 | 31 | 22 | 23 | 25 | 40 | 83 | 58 | 59 | 40 |
| 16 | 1962 | 54 | 35 | 28 | 29 | 41 | 38 | 29 | 32 | 33 | 47 |
| 17 | 2275 | 59 | 43 | 64 | 65 | 30 | 18 | 47 | 84 | 85 | 87 |
| 18 | 2429 | 43 | 60 | 32 | 33 | 71 | 60 | 30 | 64 | 65 | 16 |
| 19 | 2886 | 65 | 72 | 36 | 37 | 23 | 45 | 38 | 34 | 35 | 84 |
| 20 | 3468 | 49 | 23 | 86 | 87 | 15 | 22 | 52 | 48 | 49 | 41 |
| 21 | 3671 | 31 | 79 | 54 | 55 | 60 | 77 | 63 | 62 | 63 | 53 |
| 22 | 4224 | 58 | 63 | 34 | 35 | 74 | 50 | 35 | 18 | 19 | 81 |
| 23 | 7799 | 42 | 82 | 60 | 61 | 72 | 51 | 46 | 68 | 69 | 86 |
| 24 | 8581 | 73 | 87 | 72 | 73 | 37 | 26 | 23 | 60 | 61 | 56 |

In Table I, the first two columns may represent UE serial numbers and their corresponding C-RNTIs respectively. The rest of the columns may represent CCEs associated with subframes 0-9, wherein the CCEs associated with subframe 3 and subframe 8 are divided into CCEs for downlink assignment and for uplink grant. As illustrated in Table I, AL=1, but it is not limited thereto, i.e., AL may also equal to 2, 4, 8, 16 . . . .

During formation of the table, taking subframe 0 as an example, a CCE may be calculated from a corresponding C-RNTI for a UE, e.g., for UE No. 1, the CCE of 81 may be calculated from the C-RNTI of 164. In an example, a plurality of CCEs may be calculated from one C-RNTI, and a predetermined number of CCEs may be selected from the plurality of CCEs, e.g., the leading CCEs may be selected. In Table I, since AL=1, the predetermined number may equal to 1. If AL=2, the predetermined number may equal to 2, and so forth.

For the same subframe, i.e., the same column of the table, a CCE conflict may occur. For example, assuming that the CCE corresponding to UE No. 4 is calculated from the C-RNTI (180) also as 81, then another CCE calculated from this C-RNTI but different from any previous CCEs in the list may be reselected, e.g., 71 for UE No. 4. Finally, the UE serial number, the C-RNTI and the updated CCE may form mapping relationship for the current subframe 0.

The CCEs for subsequent subframes may be processed as described above to eliminate or at least reduce the conflicts. This may be applicable to all of the subsequent subframes.

In the case that there are a limited number of UEs, the static or semi-static table may be useful. However, if a large number of UEs are attached to the cell, an approach for reducing possibility of the CCE conflicts may be utilized.

Table II below illustrates an approach for grouping all available C-RNTIs. The C-RNTIs may range e.g. from 61 to 65535, and what are listed below is only part of 61 to 65535, i.e., 101-140 which are different from each other as an example in Table II. It should be noted that although the C-RNTIs are shown in sequence from 101 to 140 in Table II, each position within any group may contain any one of 101-140 as long as all of the values 101-140 are distributed over these 40 positions in Table II. All of the available C-NRTIs may be divided into a number of groups corresponding to the aggregation level, e.g., 4 groups when AL=1; 2 groups when AL=2; and 1 group when AL=4. That is, the number is corresponding to the aggregation level. Moreover, the number of CCEs required for each group may also be corresponding to the aggregation level, e.g., when AL=1, the number of CCEs required may be 1; when AL=2, the number of CCEs required may be 2; and when AL=4, the number of CCEs required may be 4.

TABLE II

Grouping of All Available C-RNTIs

| CRNTI | 101 | 102 | 103 | 104 | 105 | 106 | 107 | 108 | 109 | 110 | 111 | 112 | 113 | 114 | 115 | 116 | 117 | 118 | 119 | 120 |
|---|---|---|---|---|---|---|---|---|---|---|---|---|---|---|---|---|---|---|---|---|
| Aggrelation level 1 | Group 0 | | | | | | | | | | Group 1 | | | | | | | | | |

TABLE II-continued

| Grouping of All Available C-RNTIs | | | | | | | | | | | | | | | | | | | | |
|---|---|---|---|---|---|---|---|---|---|---|---|---|---|---|---|---|---|---|---|---|
| Aggrelation level 2 | Group 0 | | | | | | | | | | | | | | | | | | | |
| Aggrelation level 4 | Group 0 | | | | | | | | | | | | | | | | | | | |
| CRNTI | 121 | 122 | 123 | 124 | 125 | 126 | 127 | 128 | 129 | 130 | 131 | 132 | 133 | 134 | 135 | 136 | 137 | 138 | 139 | 140 |
| Aggrelation level 1 | Group 2 | | | | | | | | | | Group 3 | | | | | | | | | |
| Aggrelation level 2 | | | | | | | Group 1 | | | | | | | | | | | | | |
| Aggrelation level 4 | | | | | | | Group 0 | | | | | | | | | | | | | |

When the m-th (m=0, 1, 2, . . . ) UE is attached to the cell at the aggregation level 1, this UE may be arranged for the group [m mod $N_l$], where $N_l$ denotes the number of groups corresponding to the aggregation level 1. That is to say, a new UE may be arranged for the next group sequentially. Then, a C-RNTI may be randomly selected from the C-RNTIs comprised in this group. For a plurality of UEs arranged for the same group, the C-RNTIs comprised in this group may be assigned to the UEs randomly or in sequence.

If a group which is to accommodate a new UE at the present aggregation level is not available, e.g., due to line breakdown, then the UE may be mapped to a group at a lower aggregation level. For example, at the aggregation level 2, when a UE is to be arranged for group 1 but this group 1 is not available, the UE may then be associated with group 2 corresponding to the aggregation level 1, and a C-RNTI may be selected from the C-RNTIs comprised in the group 2 at the aggregation level 1.

As an example, the UE which is associated with group 1 at the aggregation level 2 may be preferably assigned with a C-RNTI comprised in the corresponding leading group (i.e., group 2) at the aggregation level.

Moreover, a new UE may be arranged for a group at a higher aggregation level, e.g., disconnected from the present aggregation level. If the number of previous UEs associated with the previous aggregation level is greater than a predetermined threshold, there may not be a respective group at the higher aggregation level. In this case, the UE may then be associated with a group at the previous aggregation level instead, and a C-RNTI may be selected from the C-RNTIs comprised in this group at the previous aggregation level.

The UE serial number, the C-RNTI and the CCE for a certain subframe (e.g., the first subframe) in Table I may be similar to the case in which each of the groups in Table II comprises only one RNTI. As an example, for Table II, the CCEs for the next subframe 1 may be predicted from those for subframe 0. This prediction from a previous subframe may be applicable to all of the subsequent subframes.

One or more CCEs may be calculated from the selected C-RNTI for the UE. In an example, a predetermined number of CCEs may be selected from the calculated CCEs, e.g., the leading CCEs may be selected. If any of the selected CCEs is identical to a previous CCE, the CCE may be reselected from the calculated CCEs.

In this way, search spaces for the UE may be misaligned as much as possible so that the leading CCEs in each of the search spaces may be available. Then, blind PDCCH searches may be reduced at the UE side.

FIG. 1 is a flow chart illustrating a method 100 for resource assignment according to some embodiments of the present disclosure. The method 100 may be performed in a base station by way of example only but it is not limited thereto.

In one embodiment, the method 100 may begin with assigning an RNTI comprised in one of a first number of groups corresponding to an aggregation level to a UE associated with this one group (block 101). At this aggregation level, for the first number of UEs, different UEs may be associated with different groups of RNTIs, and the different groups may be corresponding to different CCEs.

As an optional example, one or more CCEs may be assigned to the UE according to the RNTI assigned to the UE (block 102). As a further example, the one or more CCEs may be calculated from the RNTI. As a still further example, the one or more CCEs may be leading results of the calculation.

As another optional example, one or more CCEs corresponding to this one group which comprises the RNTI may be assigned (block 103).

As a further example, the UE may be associated with the group among the first number of groups by sequence.

In an example, each of the groups may comprise one RNTI. If the first number of groups form a static table, then this group may further comprise one or more CCE corresponding to the RNTI.

In another example, each of the groups may comprise a plurality of RNTIs. The plurality of RNTIs of each group may be assigned to different UEs associated with the group randomly or in sequence.

The RNTI comprised in each group may be related to the CCE corresponding to the group.

As an example, the method 100 may be performed with respect to at least a first subframe. The method 100 may also extend to each of the subsequent subframes by prediction from its previous subframe.

As an example, the number of CCEs corresponding to each group may equal to the aggregation level, e.g., when AL=2, the number of CCEs for each group equals to 2.

In an optional example, if a group of the first number of groups corresponding to the aggregation level is not available, the UE may be associated with one of a second number of groups corresponding to a lower aggregation level than the aggregation level.

In an optional example, if the aggregation level is higher than a previous aggregation level associated with previous UEs and the number of previous UEs with the previous aggregation level is larger than a threshold, the UE may be associated with one of a third number of groups corresponding to the previous aggregation level.

Figure 2:
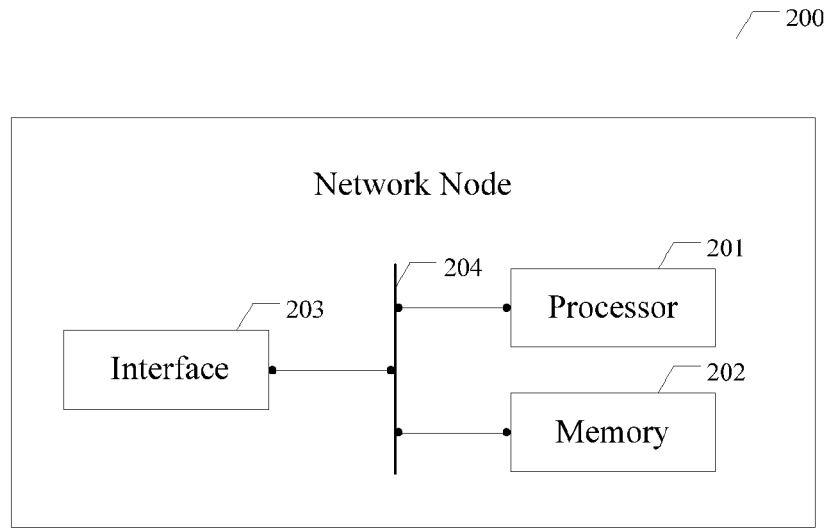
FIG. 2 is a block diagram illustrating a network node for resource assignment according to some embodiments of the present disclosure.

FIG. 2 is a block diagram illustrating a network node 200 for resource assignment according to some embodiments of the present disclosure. As an example, the network node 200 may be implemented as a base station, but it is not limited thereto. It should be appreciated that the network node 200 may be implemented using components other than those illustrated in FIG. 2.

With reference to FIG. 2, the network node 200 may comprise at least a processor 201, a memory 202, an interface 203 and a communication medium 204. The processor 201, the memory 202 and the interface 203 may be communicatively coupled to each other via the communication medium 204.

The processor 201 may include one or more processing units. A processing unit may be a physical device or article of manufacture comprising one or more integrated circuits that read data and instructions from computer readable media, such as the memory 202, and selectively execute the instructions. In various embodiments, the processor 201 may be implemented in various ways. As an example, the processor 201 may be implemented as one or more processing cores. As another example, the processor 201 may comprise one or more separate microprocessors. In yet another example, the processor 201 may comprise an application-specific integrated circuit (ASIC) that provides specific functionality. In still another example, the processor 201 may provide specific functionality by using an ASIC and/or by executing computer-executable instructions.

The memory 202 may include one or more computer-usable or computer-readable storage medium capable of storing data and/or computer-executable instructions. It should be appreciated that the storage medium is preferably a non-transitory storage medium.

The interface 203 may be a device or article of manufacture that enables the network node 200 to send data to or receive data from external devices.

The communication medium 204 may facilitate communication among the processor 201, the memory 202 and the interface 203. The communication medium 204 may be implemented in various ways. For example, the communication medium 204 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 2, the instructions stored in the memory 202 may include those that, when executed by the processor 201, cause the network node 200 to implement the method described with respect to FIG. 1.

Figure 3:
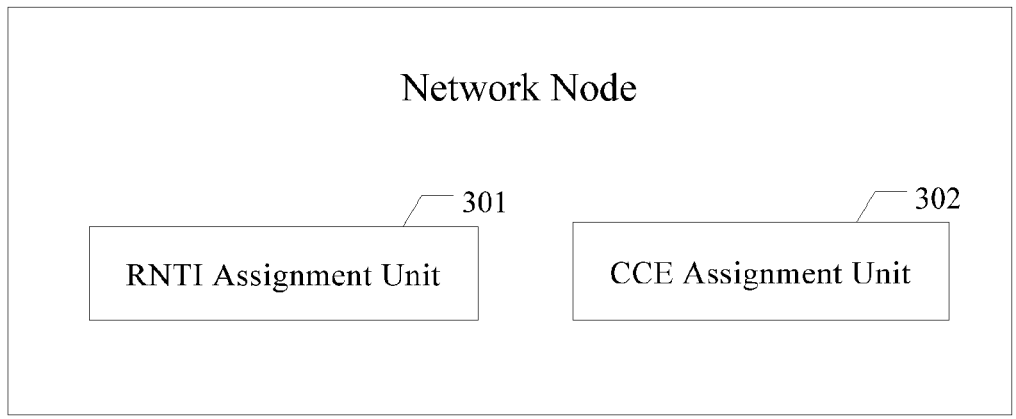
FIG. 3 is another block diagram illustrating a network node for resource assignment according to some embodiments of the present disclosure.

FIG. 3 is another block diagram illustrating a network node 300 for resource assignment according to some embodiments of the present disclosure. As an example, the network node 300 may be implemented as a base station, but it is not limited thereto. It should be appreciated that the network node 300 may be implemented using components other than those illustrated in FIG. 3.

With reference to FIG. 3, the network node 300 may comprise at least an RNTI assignment unit 301. The RNTI assignment unit 301 may be adapted to perform at least the operation described in the block 101 of FIG. 1.

As an example, the network node 300 may further comprise a CCE assignment unit 302. The CCE assignment unit 302 may be adapted to perform at least the operations described in the blocks 102-103 of FIG. 1.

Some units are illustrated as separate units in FIG. 3. However, this is merely to indicate that the functionality is separated. The units may be provided as separate elements. However, other arrangements are possible, e.g., some of them may be combined as one unit. Any combination of the units may be implemented in any combination of software, hardware, and/or firmware in any suitable location. For example, there may be more controllers configured separately, or just one controller for all of the components.

The units shown in FIG. 3 may constitute machine-executable instructions embodied within e.g. a machine readable medium, which when executed by a machine will cause the machine to perform the operations described. Besides, any of these units may be implemented as hardware, such as an application specific integrated circuit (ASIC), Digital Signal Processor (DSP), Field Programmable Gate Array (FPGA) or the like.

Moreover, it should be appreciated that the arrangements described herein are set forth only as examples. Other arrangements (e.g., more controllers or more detectors, etc.) may be used in addition to or instead of those shown, and some units may be omitted altogether. Functionality and cooperation of these units are correspondingly described in more detail with reference to FIG. 1.

Figure 4:
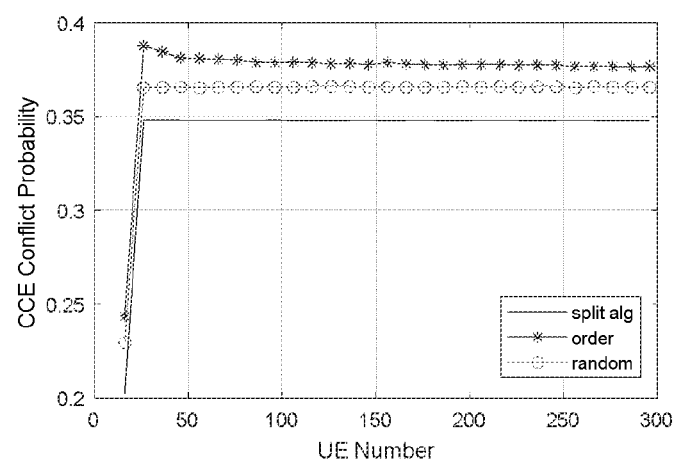
FIG. 4 is a graph illustrating CCE conflict probabilities vs. UE numbers with respect to different approaches.

FIG. 4 is a graph illustrating CCE conflict probabilities vs. UE numbers with respect to different approaches. As shown in FIG. 4, in the case of LTE 20 MHz at the aggregation level 1, performances for random selection of RNTIs, for selection of RNTIs in a row, and for grouping of RNTIs according to the present disclosure which is shown as the split algorithm are compared. When there are not so many UEs attached in a cell, the grouping approach may reduce CCE conflicts by 12% and 22% as compared to the other two approaches respectively. When there are many UEs attached, the CCE conflicts may be reduced by 4% and 9% respectively.

Figure 5:
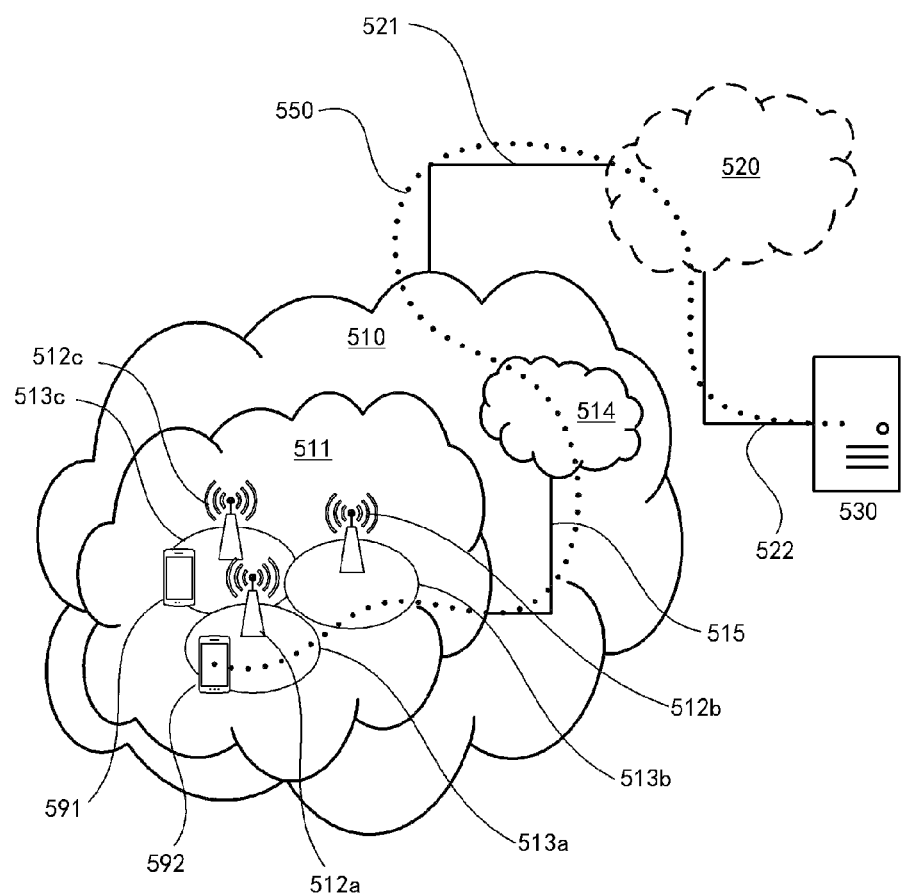
FIG. 5 is a block diagram schematically illustrating a telecommunication network connected via an intermediate network to a host computer.

FIG. 5 is a block diagram schematically illustrating a telecommunication network connected via an intermediate network to a host computer.

With reference to FIG. 5, in accordance with an embodiment, a communication system includes a telecommunication network 510, such as a 3GPP-type cellular network, which comprises an access network 511, such as a radio access network, and a core network 514. The access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to the core network 514 over a wired or wireless connection 515. A first user equipment (UE) 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

The telecommunication network 510 is itself connected to a host computer 530, which may be embodied in the hardware and/or software of a standalone server, a cloud-implemented server, a distributed server or as processing resources in a server farm. The host computer 530 may be under the ownership or control of a service provider, or may be operated by the service provider or on behalf of the service provider. The connections 521, 522 between the telecommunication network 510 and the host computer 530 may extend directly from the core network 514 to the host computer 530 or may go via an optional intermediate network 520. The intermediate network 520 may be one of, or a combination of more than one of, a public, private or hosted network; the intermediate network 520, if any, may be a backbone network or the Internet; in particular, the intermediate network 520 may comprise two or more subnetworks (not shown).

The communication system of FIG. 5 as a whole enables connectivity between one of the connected UEs 591, 592 and the host computer 530. The connectivity may be described as an over-the-top (OTT) connection 550. The host computer 530 and the connected UEs 591, 592 are configured to communicate data and/or signaling via the OTT connection 550, using the access network 511, the core network 514, any intermediate network 520 and possible further infrastructure (not shown) as intermediaries. The OTT connection 550 may be transparent in the sense that the participating communication devices through which the OTT connection 550 passes are unaware of routing of uplink and downlink communications. For example, a base station 512 may not or need not be informed about the past routing of an incoming downlink communication with data originating from a host computer 530 to be forwarded (e.g., handed over) to a connected UE 591. Similarly, the base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In a communication system 600, a host computer 610 comprises hardware 615 including a communication interface 616 configured to set up and maintain a wired or wireless connection with an interface of a different communication device of the communication system 600. The host computer 610 further comprises processing circuitry 618, which may have storage and/or processing capabilities. In particular, the processing circuitry 618 may comprise one or more programmable processors, application-specific integrated circuits, field programmable gate arrays or combinations of these (not shown) adapted to execute instructions. The host computer 610 further comprises software 611, which is stored in or accessible by the host computer 610 and executable by the processing circuitry 618. The software 611 includes a host application 612. The host application 612 may be operable to provide a service to a remote user, such as a UE 630 connecting via an OTT connection 650 terminating at the UE 630 and the host computer 610. In providing the service to the remote user, the host application 612 may provide user data which is transmitted using the OTT connection 650.

The communication system 600 further includes a base station 620 provided in a telecommunication system and comprising hardware 625 enabling it to communicate with the host computer 610 and with the UE 630. The hardware 625 may include a communication interface 626 for setting up and maintaining a wired or wireless connection with an interface of a different communication device of the communication system 600, as well as a radio interface 627 for setting up and maintaining at least a wireless connection 670 with a UE 630 located in a coverage area (not shown in FIG. 6) served by the base station 620. The communication interface 626 may be configured to facilitate a connection 660 to the host computer 610. The connection 660 may be direct or it may pass through a core network (not shown in FIG. 6) of the telecommunication system and/or through one or more intermediate networks outside the telecommunication system. In the embodiment shown, the hardware 625 of the base station 620 further includes processing circuitry 628, which may comprise one or more programmable processors, application-specific integrated circuits, field programmable gate arrays or combinations of these (not shown) adapted to execute instructions. The base station 620 further has software 621 stored internally or accessible via an external connection.

The communication system 600 further includes the UE 630 already referred to. Its hardware 635 may include a radio interface 637 configured to set up and maintain a wireless connection 670 with a base station serving a coverage area in which the UE 630 is currently located. The hardware 635 of the UE 630 further includes processing circuitry 638, which may comprise one or more programmable processors, application-specific integrated circuits, field programmable gate arrays or combinations of these (not shown) adapted to execute instructions. The UE 630 further comprises software 631, which is stored in or accessible by the UE 630 and executable by the processing circuitry 638. The software 631 includes a client application 632. The client application 632 may be operable to provide a service to a human or non-human user via the UE 630, with the support of the host computer 610. In the host computer 610, an executing host application 612 may communicate with the executing client application 632 via the OTT connection 650 terminating at the UE 630 and the host computer 610. In providing the service to the user, the client application 632 may receive request data from the host application 612 and provide user data in response to the request data. The OTT connection 650 may transfer both the request data and the user data. The client application 632 may interact with the user to generate the user data that it provides.

Figure 6:
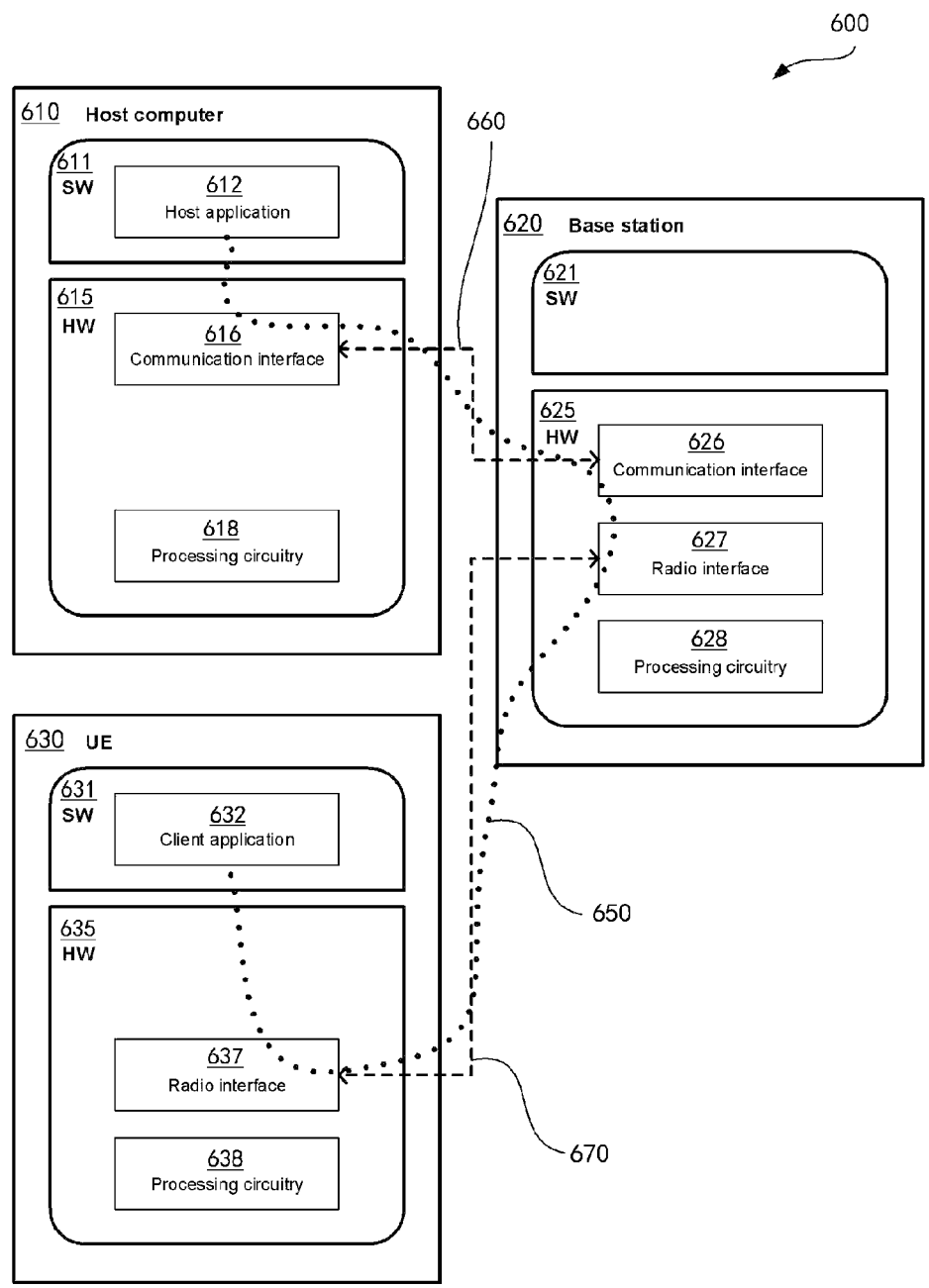
FIG. 6 is a generalized block diagram of a host computer communicating via a base station with a user equipment over a partially wireless connection.

It is noted that the host computer 610, base station 620 and UE 630 illustrated in FIG. 6 may be identical to the host computer 530, one of the base stations 512a, 512b, 512c and one of the UEs 591, 592 of FIG. 5, respectively. This is to say, the inner workings of these entities may be as shown in FIG. 6 and independently, the surrounding network topology may be that of FIG. 5.

In FIG. 6, the OTT connection 650 has been drawn abstractly to illustrate the communication between the host computer 610 and the use equipment 630 via the base station 620, without explicit reference to any intermediary devices and the precise routing of messages via these devices. Network infrastructure may determine the routing, which it may be configured to hide from the UE 630 or from the service provider operating the host computer 610, or both. While the OTT connection 650 is active, the network infrastructure may further take decisions by which it dynamically changes the routing (e.g., on the basis of load balancing consideration or reconfiguration of the network).

The wireless connection 670 between the UE 630 and the base station 620 is in accordance with the teachings of the embodiments described throughout this disclosure. One or more of the various embodiments improve the performance of OTT services provided to the UE 630 using the OTT connection 650, in which the wireless connection 670 forms the last segment. More precisely, the teachings of these embodiments may improve the radio resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 650 between the host computer 610 and UE 630, in response to variations in the measurement results. The measurement procedure and/or the network functionality for reconfiguring the OTT connection 650 may be implemented in the software 611 of the host computer 610 or in the software 631 of the UE 630, or both. In embodiments, sensors (not shown) may be deployed in or in association with communication devices through which the OTT connection 650 passes; the sensors may participate in the measurement procedure by supplying values of the monitored quantities exemplified above, or supplying values of other physical quantities from which software 611, 631 may compute or estimate the monitored quantities. The reconfiguring of the OTT connection 650 may include message format, retransmission settings, preferred routing etc.; the reconfiguring need not affect the base station 620, and it may be unknown or imperceptible to the base station 620. Such procedures and functionalities may be known and practiced in the art. In certain embodiments, measurements may involve proprietary UE signaling facilitating the host computer's 610 measurements of throughput, propagation times, latency and the like. The measurements may be implemented in that the software 611, 631 causes messages to be transmitted, in particular empty or 'dummy' messages, using the OTT connection 650 while it monitors propagation times, errors etc.

Figure 7:
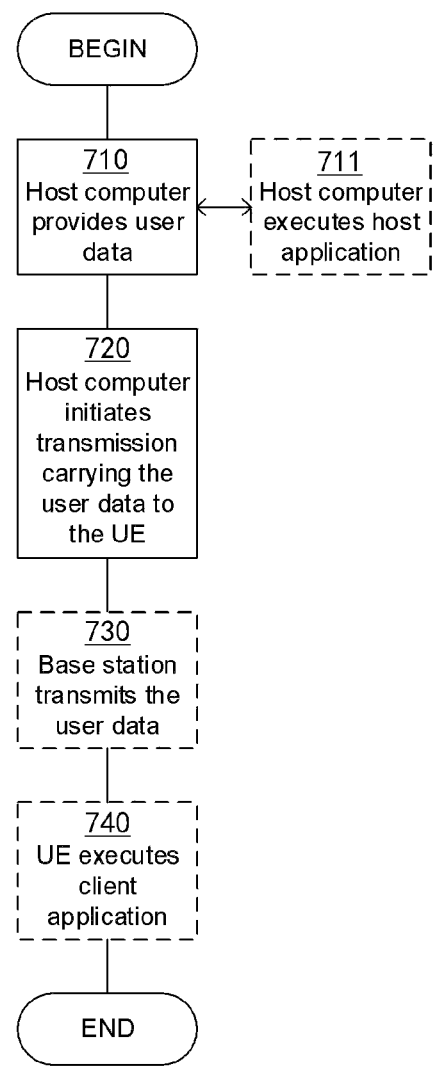
FIGS. 7 to 10 are flowcharts illustrating methods implemented in a communication system including a host computer, a base station and a user equipment.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In a first step 710 of the method, the host computer provides user data. In an optional substep 711 of the first step 710, the host computer provides the user data by executing a host application. In a second step 720, the host computer initiates a transmission carrying the user data to the UE. In an optional third step 730, the base station transmits to the UE the user data which was carried in the transmission that the host computer initiated, in accordance with the teachings of the embodiments described throughout this disclosure. In an optional fourth step 740, the UE executes a client application associated with the host application executed by the host computer.

Figure 8:
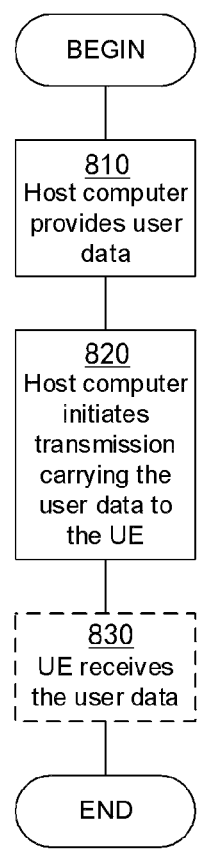

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In a first step 810 of the method, the host computer provides user data. In an optional substep (not shown) the host computer provides the user data by executing a host application. In a second step 820, the host computer initiates a transmission carrying the user data to the UE. The transmission may pass via the base station, in accordance with the teachings of the embodiments described throughout this disclosure. In an optional third step 830, the UE receives the user data carried in the transmission.

Figure 9:
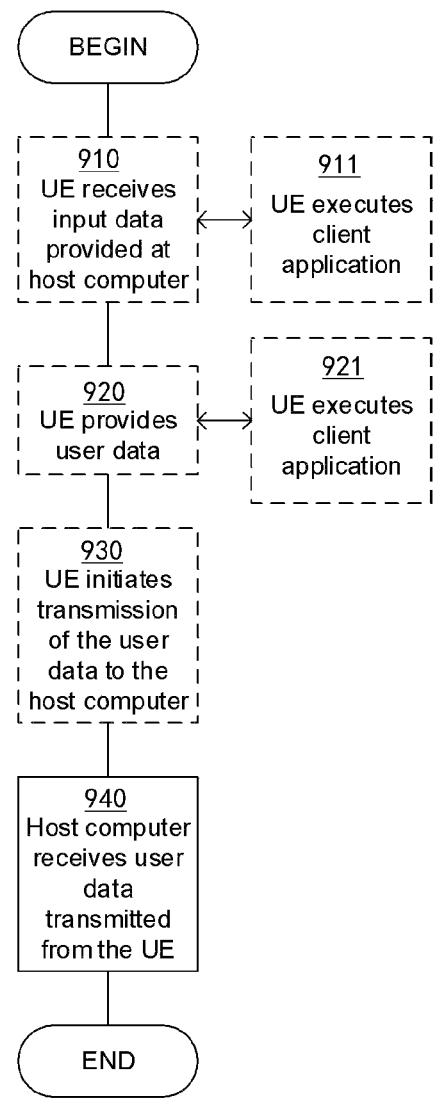

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In an optional first step 910 of the method, the UE receives input data provided by the host computer. Additionally or alternatively, in an optional second step 920, the UE provides user data. In an optional substep 921 of the second step 920, the UE provides the user data by executing a client application. In a further optional substep 911 of the first step 910, the UE executes a client application which provides the user data in reaction to the received input data provided by the host computer. In providing the user data, the executed client application may further consider user input received from the user. Regardless of the specific manner in which the user data was provided, the UE initiates, in an optional third substep 930, transmission of the user data to the host computer. In a fourth step 940 of the method, the host computer receives the user data transmitted from the UE, in accordance with the teachings of the embodiments described throughout this disclosure.

Figure 10:
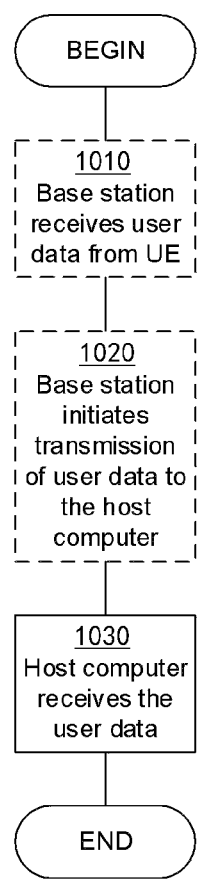

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In an optional first step 1010 of the method, in accordance with the teachings of the embodiments described throughout this disclosure, the base station receives user data from the UE. In an optional second step 1020, the base station initiates transmission of the received user data to the host computer. In a third step 1030, the host computer receives the user data carried in the transmission initiated by the base station.

Some portions of the foregoing detailed description have been presented in terms of algorithms and symbolic representations of transactions on data bits within a computer memory. These algorithmic descriptions and representations are ways used by those skilled in the signal processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more signal processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed signal processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method implemented by a network node in a communication network, comprising:
assigning, to a user equipment (UE), a radio network temporary identity (RNTI) comprised in one group of a first number of groups of RNTIs, wherein:
the first number of groups of RNTIs corresponds to an aggregation level of control channel elements (CCEs),
each group of the first number of groups corresponds to different CCEs than other groups of the first number of groups,
when no group of the first number of groups corresponding to the aggregation level is available, the UE is assigned an RNTI from one group of a second number of groups of RNTIs, and the second number corresponds to a different aggregation level that is lower than the aggregation level.

2. The method of claim 1, further comprising: assigning one or more CCEs to the UE based on the RNTI assigned to the UE.

3. The method of claim 2 wherein the one or more CCEs are calculated from the RNTI.

4. The method of claim 3, wherein the one or more CCEs are leading results of the calculation.

5. The method of claim 1, further comprising assigning one or more CCEs corresponding to the one group comprising the RNTI.

6. The method of claim 1, wherein the UE is associated with or assigned to the one group, of the first number of groups, based on sequential order of attachment to a cell served by the network node.

7. The method of claim 1, wherein each group comprises one RNTI.

8. The method of claim 7, wherein the first number of groups form a static table, with each group comprising one RNTI and one or more corresponding CCEs.

9. The method of claim 1, wherein each group comprises multiple RNTIs.

10. The method of claim 9, wherein the RNTI is assigned to the UE randomly or sequentially from among the multiple RNTIs comprising the one group.

11. The method of claim 1, wherein the method is performed with respect to a first subframe.

12. The method of claim 1, wherein the number of CCEs corresponding to each group equals to an aggregation level.

13. The method of claim 1, wherein the RNTI comprised in each group and the CCE corresponding to the group are related.

14. The method of claim 1, wherein when the aggregation level is higher than a previous aggregation level associated with previous UEs and a number of previous UEs associated with or assigned to the previous aggregation level is larger than a threshold, the UE is assigned an RNTI from one group of a third number of groups of RNTIs, wherein the third number corresponds to the previous aggregation level.

15. A network node in a communication network, comprising:
a processor; and
a memory communicatively coupled to the processor and adapted to store instructions which, when executed by the processor, cause the network node to perform operations of the method of claim 1.

16. A non-transitory computer readable medium having a computer program stored thereon which, when executed by one or more processors of a network node in a communication network, causes the network node to perform operations of the method of claim 1.

* * * * *